United States Patent
Seel et al.

(10) Patent No.: US 10,527,139 B2
(45) Date of Patent: Jan. 7, 2020

(54) CURVE FREE DRIVE DEVICE FOR MOTOR VEHICLE SHADE

(71) Applicant: Macauto Industrical Co., Ltd., Tainan (TW)

(72) Inventors: Holger Seel, Wuppertal (DE); Sven-Oliver Seel, Wuppertal (DE)

(73) Assignee: Macauto Industrial Co., Ltd., Yongkang District, Tainan (TW)

( * ) Notice: Subject to any disclaimer, the term of this patent is extended or adjusted under 35 U.S.C. 154(b) by 340 days.

(21) Appl. No.: 15/613,176

(22) Filed: Jun. 3, 2017

(65) Prior Publication Data
US 2017/0363187 A1   Dec. 21, 2017

(30) Foreign Application Priority Data

Jun. 17, 2016  (DE) .................. 10 2016 111 167

(51) Int. Cl.
*F16H 19/06* (2006.01)
*B60J 1/20* (2006.01)

(52) U.S. Cl.
CPC ............ *F16H 19/06* (2013.01); *B60J 1/2019* (2013.01); *B60J 1/2025* (2013.01); *B60J 1/2044* (2013.01)

(58) Field of Classification Search
CPC ....... F16H 19/06; B60J 1/2019; B60J 1/2025; B60J 1/2044
See application file for complete search history.

(56) References Cited

U.S. PATENT DOCUMENTS

| 10,047,837 | B2* | 8/2018 | Takarabe | ................ F16H 7/023 |
| 2008/0017335 | A1* | 1/2008 | Pohl | ........................... B60J 1/17 |
| | | | | 160/370.22 |

FOREIGN PATENT DOCUMENTS

| CN | 101120856 A | 2/2008 | |
| CN | 101302917 A | 11/2008 | |
| CN | 101484330 A | 7/2009 | |
| DE | 202004014652 U1 | 3/2006 | |
| DE | 202008009763 U1 | 11/2009 | |
| EP | 1979182 B1 | 10/2008 | |
| JP | 57140959 A * | 8/1982 | ............. F16H 19/06 |
| WO | WO-2005082656 A1 * | 9/2005 | ............ B60J 1/2022 |
| WO | WO2008037803 | 4/2008 | |

\* cited by examiner

*Primary Examiner* — Thomas C Diaz
(74) *Attorney, Agent, or Firm* — Von Rohrscheidt Patents

(57) ABSTRACT

A drive device for a shade for vehicles, the drive device comprising a slider that is movable between a first position and a second position; a rope at which the slider is attached and configured to move the slider between the first position and the second position; a rod mounted at the slider and supported by the slider along a movement path of the rod; a deflection device that deflects the rope coming out of the slider in a first direction into a second opposite direction and that is arranged laterally from the movement path of the rod; a housing in which the deflection device is arranged; a support or guide tube in which the slider is movable and which is arranged at the housing; and a return device which displaces the rope that is deflected into the opposite direction in a direction towards the movement path of the rod.

13 Claims, 1 Drawing Sheet

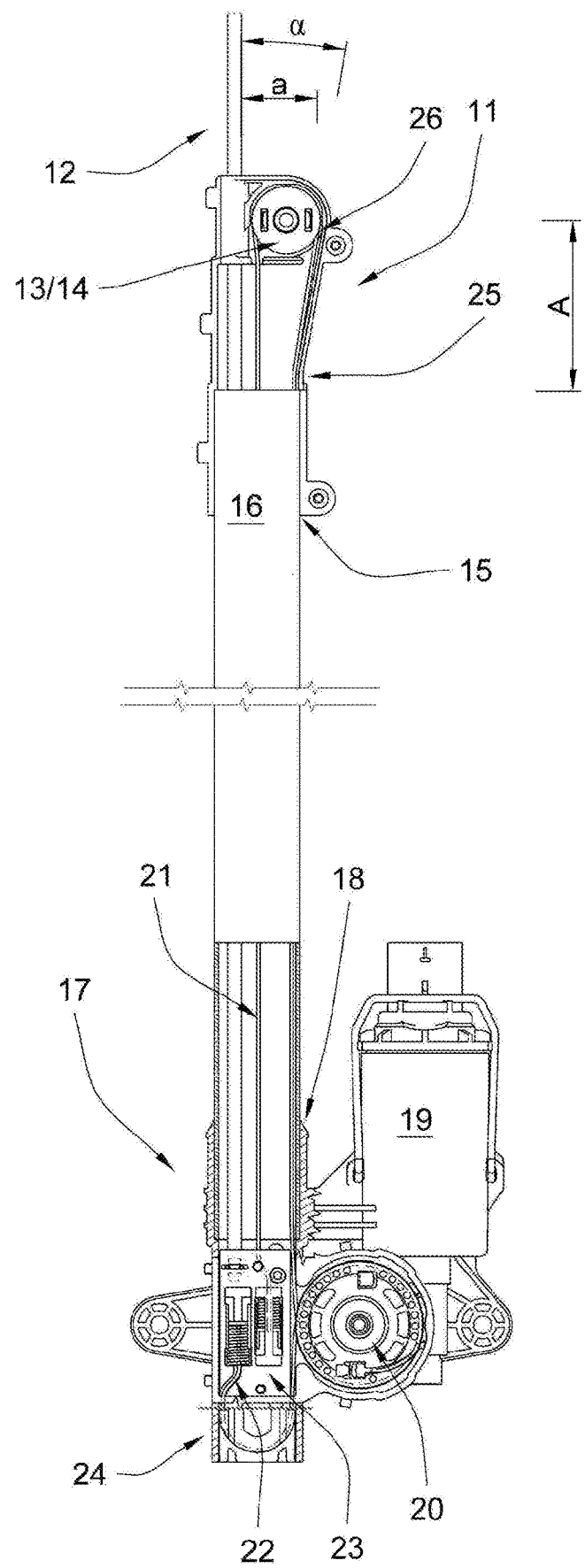

CURVE FREE DRIVE DEVICE FOR MOTOR VEHICLE SHADE

RELATED APPLICATIONS

This application claims priority from and incorporates by reference German Patent Application DE10 2016 111 167.8 filed on Jun. 17, 2016.

FIELD OF THE INVENTION

The invention relates to a drive device for a shade for vehicles, in particular for a rear window or side window roller blind of a car.

BACKGROUND OF THE INVENTION

A drive device of this generic type is illustrated e. g. in EP 1 979 182 B1. In this drive device ropes are run over an upper deflection device and a bottom deflection device, wherein the top deflection device is simultaneously configured as a drive roller. The lower deflection device is also configured as a roller whose diameter is larger than a width of the slider measured transversal to the movement path. A roller diameter is size adapted to requirements of the drive rope. The drive rope has to be supported with a minimum radius in order to accommodate a bending elasticity of the drive rope.

Since the slider is moved in a support tube whose diameter is adapted to a diameter of the slider and the slider has an accordingly reduced opening width compared to a diameter of the deflection device the drive rope has to be returned in a direction of the movement path of the slider or the rod attached at the slider after the drive rope has run over the deflection roller so that the rope runs in the support tube. For this purpose the housing supporting the lower deflection device includes a so called return device. This is a neck shaped housing section in which the housing diameter is tapered relative to the diameter of the deflection device. In this neck section the drive rope slides over an inner housing surface which is used as return section.

Running the rope over the deflection device and the return section has proven to be a down side of the prior art. The rope is run in an S-shape with comparatively tight radii. The occurring cyclic bending loads reduce the service life of the drive rope.

BRIEF SUMMARY OF THE INVENTION

Thus, it is an object of the invention to provide a drive device which reduces the cyclic bending loads.

The object is achieved by A drive device for a shade for vehicles, the drive device including a slider that is movable between a first position and a second position; a rope at which the slider is attached and which is configured to move the slider between the first position and the second position; a rod mounted at the slider and supported by the slider along a movement path of the rod; a deflection device that deflects the rope coming out of the slider in a first direction into a second opposite direction and that is arranged laterally from the movement path of the rod; a housing in which the deflection device is arranged; a support or guide tube in which the slider is movable and which is arranged at the housing; and a return device which displaces the rope that is deflected into the opposite direction in a direction towards the movement path of the rod, wherein the rope is run between an exit point from the deflection device and an entry point into the return device along a return path that is oriented at an acute angle relative to the movement path of the rod.

Supporting the rope at an acute angle relative to the movement path of the rod reduces the envelopment angles of the rope about the deflection device on the one hand side and about the return device on the other hand side. This greatly reduces cyclic bending tensions.

It is provided that the rope is returned into the direction of the movement path of the rod without an S-turn which is in particular facilitated in that the acute angle that is enclosed by the movement path of the rod and the return path of the rope is in a range of 40 degrees to 5 degrees, in particular 30 degrees to 5 degrees, advantageously 20 degrees to 10 degrees, in particular approximately 9 degrees to 10 degrees.

It is furthermore provided that an envelopment angle of the rope about the deflection device is between 185 degrees and 220 degrees, in particular 190 degrees.

The rope support according to the invention has the effect that the return device is significantly offset in a vertical direction from the deflection device. Therefore it is provided in particular that the vertical distance between the deflection device and the return device corresponds to approximately 1. 5 times to 2.5 times, in particular approximately 2 times a horizontal distance between the movement path of the rod and an exit point of the rope from the deflection device.

In order to provide a correct support of the slider in the housing of the deflection device under these conditions it is provided that the housing includes a support device for the slider that is arranged spatially adjacent to the return path.

Thus, it is either provided that the support device is formed by an end section of the support tube that is inserted into the housing or that the return device is formed by the inner wall of the housing itself.

In order to run the rope into the return device unimpeded it is provided that the support device includes a recess in which the return path of the rope is arranged.

BRIEF DESCRIPTION OF THE DRAWINGS

The invention is subsequently described based on an embodiment with reference to a drawing figure, wherein:

FIG. 1 illustrates a partial sectional view of the drive device of the invention.

DETAILED DESCRIPTION OF THE INVENTION

In the drawing figure an entire drive device is designated with a reference numeral 10.

The drive device 10 includes an upper housing element 11 from which a rod 12 exits for controlling a sun shade for vehicles, in particular for controlling a rear window or side window roller blind for cars.

The upper housing element 11 includes a first deflection device 13 configured as a deflection roller 14. At an end of the housing element 11 that is oriented away from the rod exit the housing element 11 includes a support tube receiver 15 in which a support tube 16 is inserted.

The support tube 16 extends from the upper housing element 11 to a lower housing element 17 which in turn keeps the support tube 16 in a support tube receiver 18.

The lower housing element 17 includes a drive 19 with an electric motor which causes a drive roller 20 to rotate. The slider 23 in the support tube 18 is moved up and down by rotating the drive roller 20 clock wise or counter clockwise by a first rope 21 and a second rope 22 which is coupled with a slider on the one hand side and the drive roller 20 on the other hand side. Thus, the rod attached in the slider 23 follows a slider movement. Thus, a pull out profile of a sun protection roller shade, wherein the pull out profile is attached at the rod 12, is moved up and down.

As evident from FIG. 1 the first rope 21 extends from the slider 23 in a vertically upward direction towards a first deflection device 13. The rope is run around the first deflection device and then run in the opposite direction to the drive roller 10. The second rope 22 exits from the slider 23 in the opposite direction and is run about a second deflection device 24 to the drive roller 20.

In order to avoid the S-curve of the first rope 21 that is known in the art the return device 25 is arranged in the vertical direction significantly below the first deflection device 13. A distance A between an apex point of the return device 25 and the exit point 26 of the second rope 22 from the deflection roller 14 corresponds to approximately 1.5 times to 2 times a distance a between an exit point 26 of the rope 22 and a vertical movement path of the rod 12. Greater distances are conceivable, however counteract a minimization of installation space. Due to a distance A between the deflection device and the return device 25 the return path of the second rope 22 and the movement path of the rod 12 encloses an acute angle α wherein the return path of the second rope 22 is arranged between the rope outlet point 26 and the apex point of the return device 25. In the instant embodiment this angle α is approximately 9 degrees to 10 degrees. For the effectiveness of the invention it is sufficient when the angle is between 40 degrees and 5 degrees, in particular between 30 degrees and 5 degrees, advantageously between 20 degrees and 10 degrees.

An envelopment angle of the second rope about the deflection roller 14 is approximately 190 degrees in the instant embodiment and is advantageously in a range between 185 degrees and 220 degrees.

Increasing a distance between the rope outlet point 26 and the return device 25 by reducing the envelopment angles of the rope 21 and by orienting the return path of the rope 21 at an acute angle to the movement path of the rod 12 significantly reduces the cyclic bending tension of the first rope 21 between the deflection roller 14 and the return device 15. This causes a much longer service life of the drive rope 21 since the load on the rope is smaller.

The slider 23 which moves into the upper housing 11 until shortly in front of the deflection roller requires support in a portion that is arranged horizontally adjacent to the return path of the first rope 21 in order to be protected against tilting and thus pivoting out. This support is provided by a suitable support device. This can either be an end section of the support tube 18 which is run under the deflection roller 14 into the housing 11. In the illustrated embodiment, however, the support is provided by the inner wall of the housing 11 itself, In order to protect the rope 22 that is run in a portion of the return path against an environmental impact the housing 11 in this embodiment includes a corresponding housing fold out that envelops the return path wherein the rope is supported within the housing fold out. However, when an end section of the support tube 16 is run into the housing, the housing has to have a suitable recess in order to facilitate a return of the rope 22. Thus, it is conceivable that the support tube 16 is slotted accordingly.

The invention shows how advantageously selecting a suitable envelopment angle, a distance of the return device 25 and the rope outlet point 26 and selecting an angle between the return path and the movement path of the rod 12 reduces a cyclic bending tension of a rope 22 to a minimum compared to the prior art. This significantly extends a service life of the rope 22 and thus a reliability of the drive device 10.

REFERENCE NUMERALS AND DESIGNATIONS

10 drive device
11 upper housing element
12 rod
13 first deflection device
14 deflection roller
15 support tube receiver
16 support tube
17 lower housing element
18 support tube receiver
19 electric motor drive
20 drive roller
21 first rope
22 second rope
23 slider
24 second deflection device
25 return device
26 exit point
A distance
a distance
α0 angle

What is claimed is:

1. A drive device for a shade for vehicles, the drive device comprising:
    a slider that is movable between a first position and a second position;
    a rope at which the slider is attached and which is configured to move the slider between the first position and the second position;
    a rod mounted at the slider and supported by the slider along a movement path of the rod;
    a deflection device that deflects the rope coming out of the slider in a first direction into a second opposite direction and that is arranged laterally from the movement path of the rod;
    a housing in which the deflection device is arranged;
    a support or guide tube in which the slider is movable and which is arranged at the housing; and
    a return device which displaces the rope that is deflected into the opposite direction in a direction towards the movement path of the rod,
    wherein the rope is run between an exit point from the deflection device and an entry point into the return device along a return path that is oriented at an acute angle relative to the movement path of the rod.

2. The drive device according to claim 1, wherein the rope is returned without an S-curve towards the direction of the movement path of the rod.

3. The drive device according to claim 1, wherein acute angles enclosed by the movement path of the rod and the return path of the rope are in a range between 40 degrees and 5 degrees.

4. The drive device according to claim 1, wherein an envelopment angle of the rope about the deflection is between 185 degrees and approximately 220 degrees.

5. The drive device according to claim 1,
    wherein the housing includes a support device for the slider, and
    wherein the support device is spatially arranged adjacent to the return path.

6. The drive device according to claim 5, wherein the support device is formed by an end section of a support tube inserted into the housing.

7. The drive device according to claim 5, wherein the return device is formed by an inner wall of the housing.

8. The drive device according to claim 5, wherein the support device includes a recess in which the return path of the rope is arranged.

9. The drive device according to claim 1, wherein a vertical distance between the deflection device and the return device corresponds to 1.5 times to 2.5 times a horizontal distance between the movement path of the rod and the exit point of the rope from the deflection device.

10. The drive device according to claim 8, wherein the recess has an inner diameter which essentially corresponds to the outer diameter of the rope.

11. The drive device according to claim 1, wherein acute angles enclosed by the movement path of the rod and the return path of the rope are in a range between 20 and 10 degrees.

12. The drive device according to claim 1, wherein an envelopment angle of the rope about the deflection is 190 degrees.

13. The drive device according to claim 1, wherein a vertical distance between the deflection device and the return device corresponds to 2.0 times a horizontal distance between the movement path of the rod and the exit point of the rope from the deflection device.

* * * * *